United States Patent
Koenig et al.

(10) Patent No.: US 7,340,401 B1
(45) Date of Patent: Mar. 4, 2008

(54) METHOD OF PRODUCT PROCUREMENT AND CASH FLOW INCLUDING A MANUFACTURER, A TRANSACTION FACILITATOR, AND THIRD PARTY PAYOR

(76) Inventors: Martin D. Koenig, 751 Milwaukee St., Delafield, WI (US) 53018; Jeffrey J. Mathy, S85 W19636 Colonial Ct., Muskego, WI (US) 53150

( * ) Notice: Subject to any disclaimer, the term of this patent is extended or adjusted under 35 U.S.C. 154(b) by 739 days.

(21) Appl. No.: 09/883,557

(22) Filed: Jun. 18, 2001

(51) Int. Cl.
*G06Q 10/00* (2006.01)
(52) U.S. Cl. .................... 705/2; 705/3; 705/4; 705/26; 600/300; 600/301
(58) Field of Classification Search ............... 705/2–4, 705/26
See application file for complete search history.

(56) References Cited

U.S. PATENT DOCUMENTS

| | | | | |
|---|---|---|---|---|
| 6,055,514 | A * | 4/2000 | Wren | 705/27 |
| 2001/0034618 | A1* | 10/2001 | Kessler et al. | 705/4 |
| 2003/0014318 | A1* | 1/2003 | De La Motte et al. | 705/26 |
| 2004/0049455 | A1* | 3/2004 | Mohsenzadeh | 705/40 |

FOREIGN PATENT DOCUMENTS

JP          2002-325048    *    3/2002

OTHER PUBLICATIONS

"Partnering with School-Based Health Centers: Connecticut's Medicaid Managed Care Experience", Managed Medicare & Medicaid, Jan. 11, 1999, ISSN: 1085-0317. Dialog ID No. 04082212 (From File 636: Gale Group Newsletter®).*

David Serko, "Nissho Iwai revisited: Rulings from Customs and IRS", Global Trade & Transportation, vol. 114, No. 7, p. 7, Jul. 1994, ISSN: 0893-7893. Dialog ID No. 00882919 (From File 15: ABI/Inform®).*

* cited by examiner

*Primary Examiner*—C. Luke Gilligan
*Assistant Examiner*—Vivek Koppikar
(74) *Attorney, Agent, or Firm*—Andrus, Sceales, Starke & Sawall, LLP

(57) ABSTRACT

A method of order placement and product delivery between a healthcare facility and a third party payor, such as an insurance provider, in which a transaction facilitator submits the order for a prescribed medical device and generates a claim from the transaction facilitator to the insurance company. The healthcare facility initially contacts the insurance provider to obtain authorization for a prescribed medical device and medical procedure. Upon granting authorization, the insurance provider contacts the transaction facilitator to select the medical device. The transaction facilitator orders the medical device and arranges for delivery from manufacturer to the healthcare facility. Upon implantation, the transaction facilitator bills the insurance provider. At no time does the healthcare facility receive a bill from the manufacturer, thereby eliminating the bill for the medical device from the healthcare facility to the insurance provider.

20 Claims, 7 Drawing Sheets

METHOD OF PRODUCT PROCUREMENT AND CASH FLOW INCLUDING A MANUFACTURER, A TRANSACTION FACILITATOR, AND THIRD PARTY PAYOR

BACKGROUND OF THE INVENTION

The present invention relates to a method of facilitating the supply of prescribed medical devices to a healthcare facility including the authorization process required by an insurance company. More specifically, the present invention relates to a method in which the insurance company contacts a transaction facilitator over a computer network who orders the required product and generates bills and payments without the healthcare facility being directly involved in the ordering and billing cycles.

Currently, many types of medical devices, such as automatic implantable defibrillators and implantable pacemakers, are ordered by a healthcare facility on an as-needed basis to replenish an on-site inventory maintained by the facility. Thus, the hospital needs to inventory these high priced items. The process of obtaining a device for use in a medical procedure typically follows the following sequence. Initially, a physician determines the patient's condition and prescribes a desired treatment for such condition. After the prescribed treatment has been determined, a representative from the hospital telephones the patient's insurer to gain pre-authorization for both the procedure and the medical device required for the treatment, as well as to verify the insurance coverage itself.

If the insurer pre-authorizes both the procedure and the device, the hospital contacts a desired manufacturer to order the device to be implanted or uses contingency stock on hand at the hospital. Upon receiving the order, the manufacturer delivers the medical device along with a bill for the device. After the device is implanted and after the patient has been discharged, the healthcare facility generates a purchase order to the manufacturer to begin the billing cycle.

After the hospital implants the medical device within the patient and the patient has been discharged, the hospital generates a claim to the insurance company for the cost of the implanted device, as well as for the cost of the procedure required to implant the device and the entire patient's hospital stay. In many cases, it is common for the hospital to include a 100%-200% mark-up in the claim to the insurance company for the implanted medical device.

After submitting a claim to the insurance company, the hospital waits to receive payment before in turn paying the device manufacturer.

As can be understood by the foregoing disclosure, the current billing and ordering process that exists between a hospital, an insurance company, and a device manufacturer clearly benefits the hospital, since the hospital is able to mark-up the product prior to passing the cost of the product on to the insurance company. Currently, it is not uncommon for a hospital to mark-up an implanted cardiac device by 100%-200% in the bill to the insurance company. Since the cost of the implanted device is included in a single invoice including other hospital costs, this large mark-up can be absorbed and not be apparent in the overall bill.

Further, since the manufacturer must bill the hospital, which in turn submits a claim to the insurance company, it often takes a significant amount of time before the actual money transfers from the insurance company through the hospital to the device manufacturer.

Therefore, it is an object of the present invention to provide an improved method of requesting and providing a desired implantable medical device to a hospital from the device manufacturer. Further, it is a object of the present invention to provide a method in which the transaction facilitator controls the price paid for the implantable medical device and provides the medical device to the hospital without a bill to the hospital from the device manufacturer. Further, it is a object of the present invention to provide a transaction facilitator that coordinates the delivery of the implantable device, as well as the billing and pre-authorization process, in order to alleviate the burden on both the hospital and the insurance company. Further, it is an object of the present invention to combine the separate billing cycles that exist between the insurance company, the hospital and the manufacturer into a single cycle to reduce the total time involved.

SUMMARY OF THE INVENTION

The present invention relates to a method of providing a medical device to a hospital upon pre-authorization by an insurance provider. The invention is further directed to a billing and delivery system in which a transaction facilitator is responsible for the product delivery and billing to the insurance provider.

Initially, a physician at a hospital or healthcare facility prescribes a desired treatment for a patient, which includes the selection of a medical device to be implanted within the patient or used during the treatment process. The hospital then contacts the patient's insurance provider to gain pre-authorization for both the medical procedure and the specified medical device.

After granting authorization, the insurance provider logs on to a website maintained by a transaction facilitator. The website includes a series of product categories, each of which include the most popular and likely products to be selected by a physician for implantation.

Once the insurance provider inputs the physician selected device, the transaction facilitator confirms the prescription of the physician to the physician. At the same time, the transaction facilitator sends an electronic message to the device manufacturer alerting the device manufacturer that a purchase order exists on the transaction facilitator's website.

Upon receiving the electronic indication, the device manufacturer logs on to the transaction facilitator website and downloads the order data. The order data typically includes the device implantation date such that the device manufacturer can determine whether delivery can be effected in the required time frame. If the manufacturer cannot deliver within the required time frame, the manufacturer will so advise the facilitator so that the facilitator can make timely delivery from its inventoried stock.

After the device has been delivered by the manufacturer to the hospital, the device is implanted by the physician and a registration card is filled out and sent back to the device manufacturer. Upon receiving the device registration, the manufacturer contacts the transaction facilitator to initiate the billing cycle.

In accordance with the present invention, the transaction facilitator generates a claim to the insurance provider while at the same time generating a bill from the manufacturer to the transaction facilitator. The claim to the insurance provider is typically transmitted electronically and received by the insurance provider. Since the device was pre-authorized, the insurance provider typically electronically transfers funds back to the transaction facilitator within the goal of a 28 day billing cycle. Upon receiving the funds from the insurance provider, the transaction facilitator electronically transfers funds to pay the bill from the device manufacturer within the same goal of a 28 day billing cycle.

In accordance with the present invention, the billing occurs between the transaction facilitator and the insurance provider without the hospital taking part. Thus, the typical mark-up included by the hospital is eliminated from the billing cycle.

Various other features, objects and advantages of the invention will be made apparent from the following description taken together with the drawings.

BRIEF DESCRIPTION OF THE DRAWINGS

The drawings illustrate the best mode presently contemplated of carrying out the invention.

In the drawings.

DETAILED DESCRIPTION OF THE INVENTION

Figure 1:
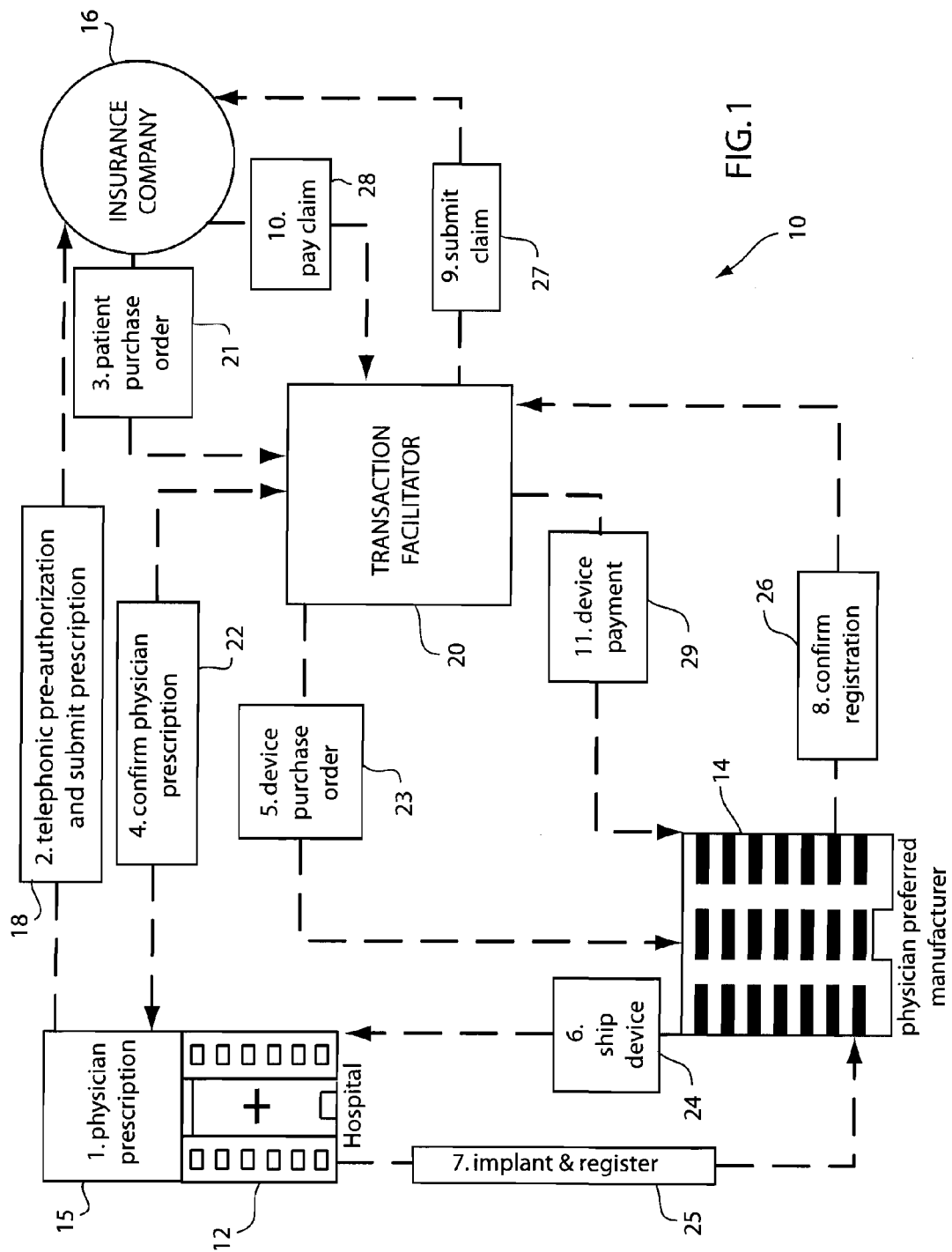
FIG. 1 is a schematic illustration of the ordering and delivery steps performed in accordance with the method of the present invention.

Referring first to FIG. 1, thereshown is a schematic illustration of the device requisition and ordering system 10 of the present invention. Although the device requisition and ordering system 10 of the present invention will be discussed primarily as used in the healthcare field for obtaining an implantable medical device, it should be understood that other industries that require approval of a procedure or the acquisition of a device prior to payment for the device by a third party payor fall within the scope of the present invention.

As illustrated in FIG. 1, a hospital 12 or other healthcare facility exists in which a patient requires a medical procedure that requires the implantation or use of a medical device which the hospital obtains from one or more potential manufacturers 14.

In accordance with the present invention, the physician associated with the hospital 12 prescribes a treatment for the patient, as illustrated by step 1 in block 15. Typically, this prescription will require some type of medical device that the hospital either maintains in a small supply in storage or must order from the manufacturer. For example, the present invention will focus on the ordering and providing of cardiac devices, such as automatic implantable cardioverter defibrillators and implantable pacemakers. Based on the prescribed treatment, an agent of the hospital or an agent of the physician contacts an insurance company 16 to relay the patient need, as indicated by block 18. In the embodiment of the invention illustrated, the agent of the hospital 12 or physician contacts the insurance company 16 by conventional telephone communications, although the inventors contemplate communication via a computer network.

Upon receiving the request from the agent, the insurance company contacts a transaction facilitator 20, as indicated by step 3 in block 21. In the embodiment of the invention illustrated in FIG. 1, the contact between the insurance company 16 and the transaction facilitator 20 occurs over a global computer network.

The transaction facilitator 20 confirms the order from the insurance company 16 by contacting the physician, as indicated by step 4 in block 22. Typically, this confirmation occurs by a phone call or electronic transmission between the transaction facilitator 20 and the physician.

Upon receiving the order from the insurance company 16, the transaction facilitator 20 contacts an individual manufacturer 14, as illustrated by step 5 in block 23. Upon receiving the order from the transaction facilitator, the manufacturer 14 delivers the required medical device to the hospital in any type of conventional manner, as illustrated by step 6 in block 24. The type of shipping between the manufacturer 14 and the hospital 12 depends upon the amount of time available between the placement of the order with the device manufacturer 14 and the projected implantation within the patient.

Referring back to FIG. 1, after the medical device has been implanted in a patient, a registration card is sent from the hospital 12 to the device manufacturer 14, as indicated by step 7 in block 25. The registration card is sent back to the manufacturer 14 for warranty purposes and so that the manufacturer 14 can alert the hospital 12 should any future product developments occur relating to the implanted device.

After the manufacturer 14 receives the registration card, the manufacturer confirms the implantation and registration by contacting the transaction facilitator 20, as illustrated by step 8 in block 26. The receipt of the registration confirmation triggers the transaction facilitator 20 to initiate the billing cycle.

Initially, the transaction facilitator submits a claim to the insurance company for the cost of the medical device, as illustrated by step 9 in block 27. Since the transaction facilitator is only involved in obtaining and providing the medical device, the claim submitted to the insurance company 16 only includes the cost of the medical device.

The insurance company 16 then issues payment to the transaction facilitator 20, as indicated by step 10 in block 28. Since the cost of the medical device was authorized by the insurance provider 16, the claim payment in block 28 is typically an automatic process handled by electronic fund transfer.

Finally, the transaction facilitator 20 issues payment to the manufacturer 14, as illustrated by step 11 in block 29. The device payment can also be handled by electronic fund transfer to speed up the payment process.

Figure 2A:
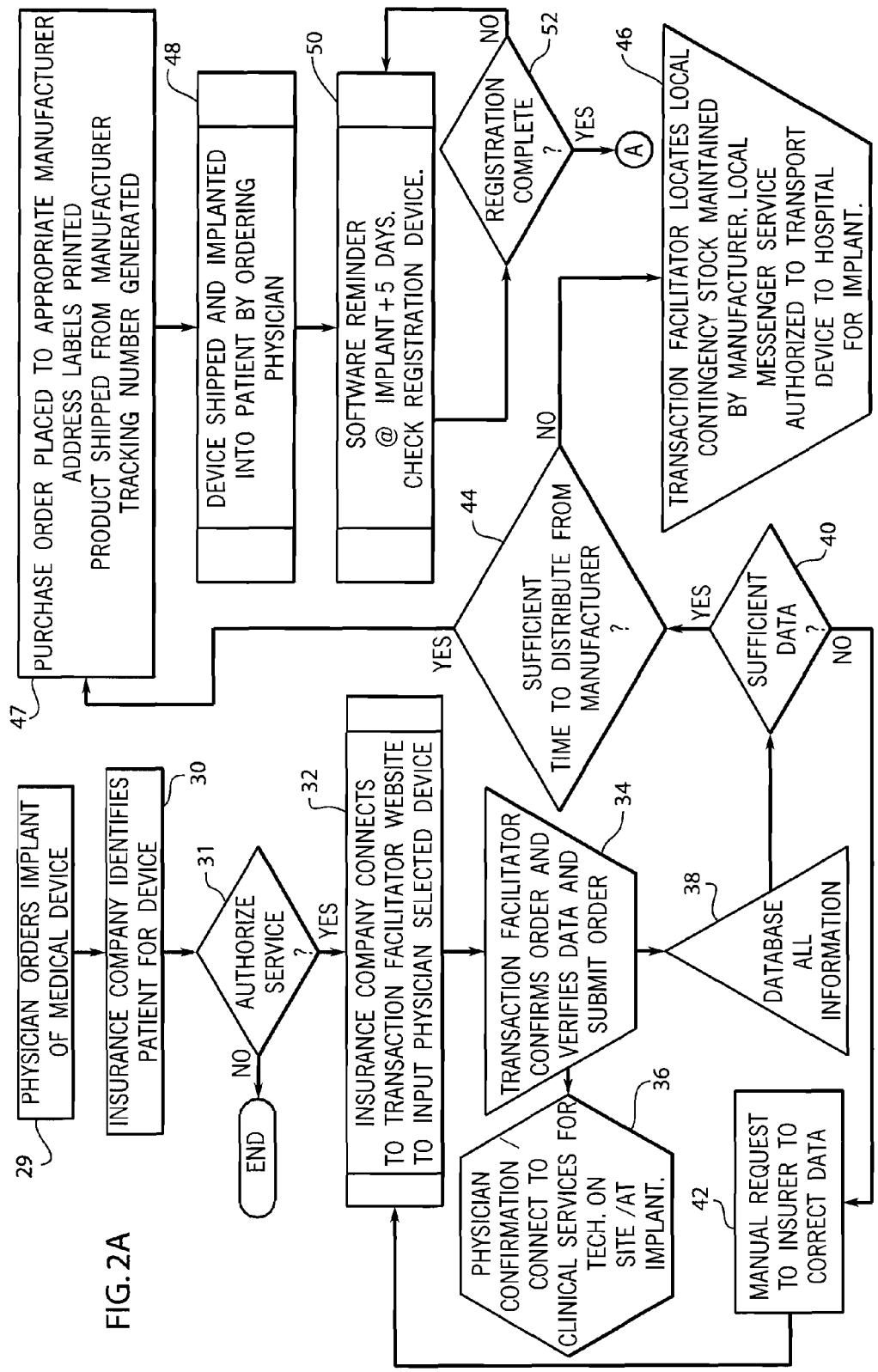
FIGS. 2a and 2b are flowcharts illustrating the steps taken in accordance with the method of the present invention.
Figure 2B:
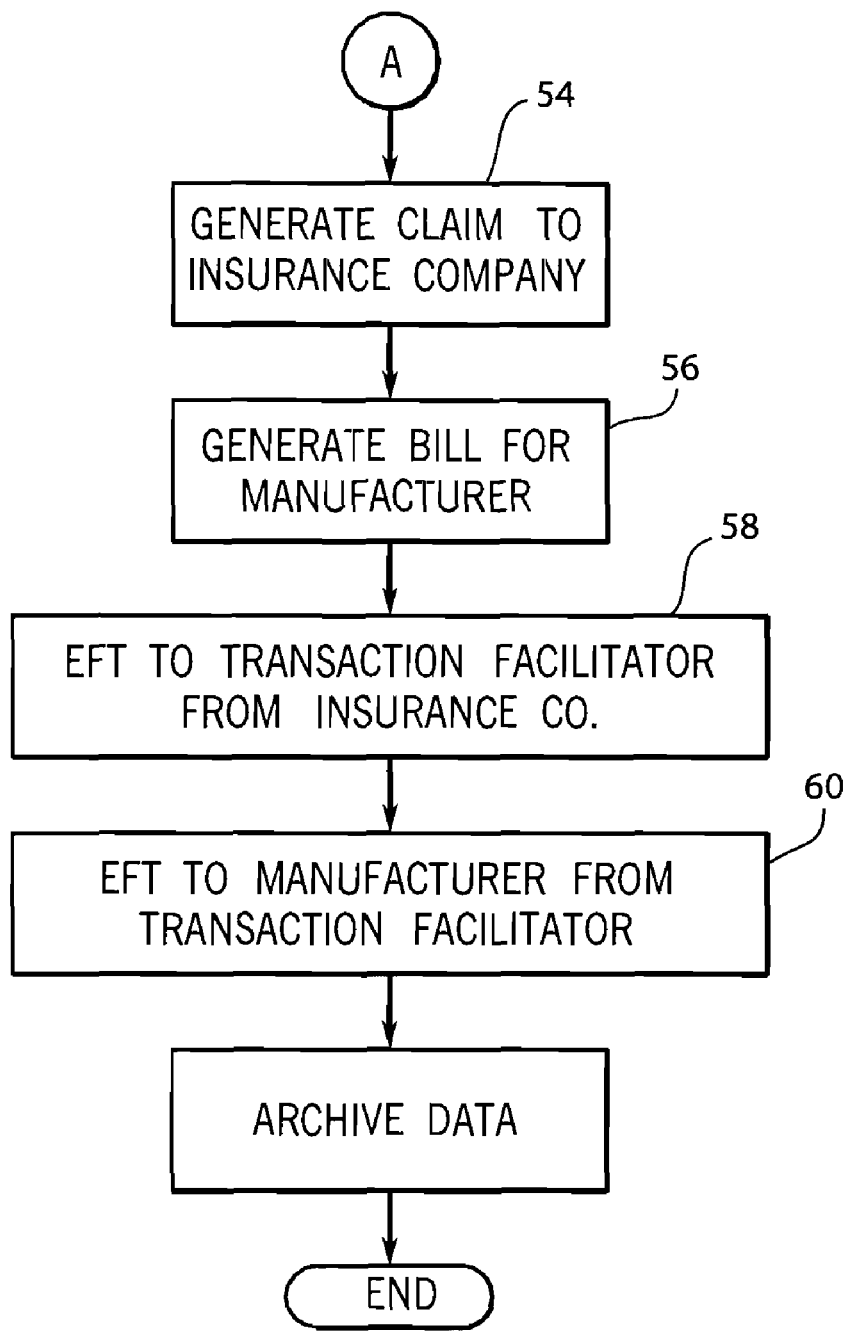

Referring now to FIGS. 2a-b, thereshown is a flowchart describing the operational sequence of the method of the present invention. FIGS. 2a-b generally correspond to the overall process shown in FIG. 1; however, FIGS. 2a-b develop the method in much greater detail.

As illustrated by step 29, the entire process begins by the physician prescribing a treatment for a patient. Typically, the treatment from the physician includes the implantation of a medical device not currently maintained in inventory at the hospital. The ordering process in step 29 typically occurs by an agent of the hospital telephoning the insurance company and providing the required information regarding the diagnosis, the implant device selected, and the date, time and location of the implant procedure.

After receiving the required information from the agent of the hospital, the insurance company identifies the particular patient and the type of coverage for the patient based upon the insurance company's internal records, as illustrated in step 30. This step utilizes the internal database from the insurance company and the types of coverage and devices covered by the specified insurance.

After receiving the patient information, the insurance company determines whether the patient's insurance authorizes the prescribed medical device and treatment ordered by the physician, as illustrated in the decision box 31. If the insurance company denies pre-authorization, the entire process terminates.

However, if the insurance company grants authorization for the procedure and the device, the insurance company connects to the transaction facilitator, as illustrated in step 32. As illustrated in step 32, the preferred method of contacting the transaction facilitator is for the insurance company to connect to a website maintained by the transaction facilitator. Typically, the website maintained by the transaction facilitator includes available medical devices the insurance company can select from based on the physician's prescription.

Since the transaction facilitator is able to deal with many manufacturers and many insurance companies, the transaction facilitator is able to obtain the best price and best selection due to the large volume of products ordered by the transaction facilitator. This ability to deal on a volume basis saves money for both the insurance company and, ultimately, the patient.

When the insurance company locates the prescribed medical device on the transaction facilitator's website, the insurance company selects that device and the order is entered into a database of the transaction facilitator. This order will contain all of the relevant information provided by the physician as to the patient, diagnosis, device selected, time, date and location of implant.

After the medical device has been ordered in step 32, the transaction facilitator confirms the order and verifies the data prior to committing the data into a database maintained by the transaction facilitator, as illustrated in step 34. In the preferred embodiment of the invention, the transaction facilitator will contact the physician by telephone, fax or electronic mail to confirm and validate the prescription and purchase order information, as illustrated in step 36.

After confirming the order with the physician, the transaction facilitator will database all information, as illustrated in step 38, and perform a check to determine whether sufficient data has been received, as illustrated in step 40. If insufficient data has been received, a manual request is directed to the insurance company to correct the data, as illustrated in step 42.

Once the data has been completed, the transaction facilitator website determines whether there is sufficient time to distribute the medical device from the manufacturer to the hospital, as illustrated in step 44. Typically, a device manufacturer can deliver a device to most locations within one to two days. However, if the transaction facilitator determines that there is not enough time to distribute the device from the manufacturer to the hospital, the transaction facilitator locates a local contingency stock maintained by the manufacturer and authorizes a messenger service to transport the device to the hospital for implant, as illustrated in step 46. Thus, the transaction facilitator is able to compensate for short turnaround time and last minute requests.

Assuming that sufficient time exists to distribute the device from the manufacturer to the hospital, a purchase order is created and sent to the appropriate manufacturer, as illustrated in step 47. Preferably, the purchase order is sent electronically from the transaction facilitator to the manufacturer.

In an alternate, contemplated embodiment of the invention, the transaction facilitator website creates an on-line purchase order and generates an e-mail to the manufacturer directing the manufacturer to log on to the transaction facilitator website to retrieve a purchase order. In this embodiment, the transaction facilitator website acts as a portal for both the manufacturer and the insurance company without actual data being transferred between the transaction facilitator and either the insurance company or the manufacturer.

Once the manufacturer has received the purchase order, the manufacturer typically ships the product from the manufacturer to the hospital using a delivery service having a tracking system. The tracking system of the delivery service allows both the manufacturer and the hospital via the insurer to monitor the current location of the medical device during its transportation to the hospital.

Once the device is received by the hospital, the physician implants the device according to the previously indicated schedule, as illustrated in step 48. In accordance with normal practices, when a medical device, such as a pacemaker, is implanted into a patient, a clinician fills out a registration card for the specific device and sends the registration card back to the manufacturer. In the flowchart of FIG. 2*a*, step 50 is used to generate a reminder to the transaction facilitator to inquire from the manufacturer whether the registration form has been filled out and returned. In the embodiment of the invention illustrated, the software reminder is generated five days after the scheduled implant date of the medical device.

Once the registration has been completed through receipt of the registration card by the manufacturer, the manufacturer will in turn forward the registration card confirmation to the transaction facilitator, as illustrated by step 52. Once confirmation of the registration has been received, the transaction facilitator generates a claim for the device to the insurance company, as illustrated by step 54 in FIG. 2*b*. It is important to note at this point that the claim from the transaction facilitator to the insurance company includes only the cost of the device and does not include any of the costs for the procedure to implant the device. Thus, the insurance company receives a claim covering only the medical device without any additional information.

It is at this point that significant cost savings are apparent to the insurance company. Typically, the hospital would bill the insurance company for the medical device, with markup, along with the bill for the surgical procedure and the entire patient's hospital stay. In accordance with the invention, the transaction facilitator is able to negotiate an agreement regarding the cost of the device based upon a larger volume ordered, which will be much lower than the hospitals charge.

At the same time the claim is generated to the insurance company, the transaction facilitator creates a bill from the manufacturer to the transaction facilitator. This "dummy bill" is used internally within the transaction facilitator to initiate the billing cycle.

As illustrated in step 58, it is contemplated that the insurance company will electronically transfer funds to the transaction facilitator within 28 days after the claim from the transaction facilitator is generated to the insurance company in step 54. Upon receiving the electronic fund transfer from the insurance company to the transaction facilitator, the transaction facilitator immediately transfers funds to the manufacturer, as illustrated in step 60.

As can be understood by the method described in reference to FIGS. 2a and 2b, the ordering and billing system of the present invention allows the transaction facilitator to receive an order from the insurance company, direct the order to a manufacturer, and control the entire billing between the insurance company and the manufacturer without involving the hospital. In this manner, the transaction facilitator is able to eliminate the potential mark-up created by the hospital in a typical billing cycle. Additionally, since the bills are generated between the transaction facilitator and the insurance company automatically, as well as the electronic transfer of money, the billing cycle can be lowered from the typical 120-180 days to a goal of 28 days. This significantly reduces the amount of accounts receivable present for the manufacturer and eliminates the need for the hospital to bill the insurance company for the cost of the medical device.

Figure 3:
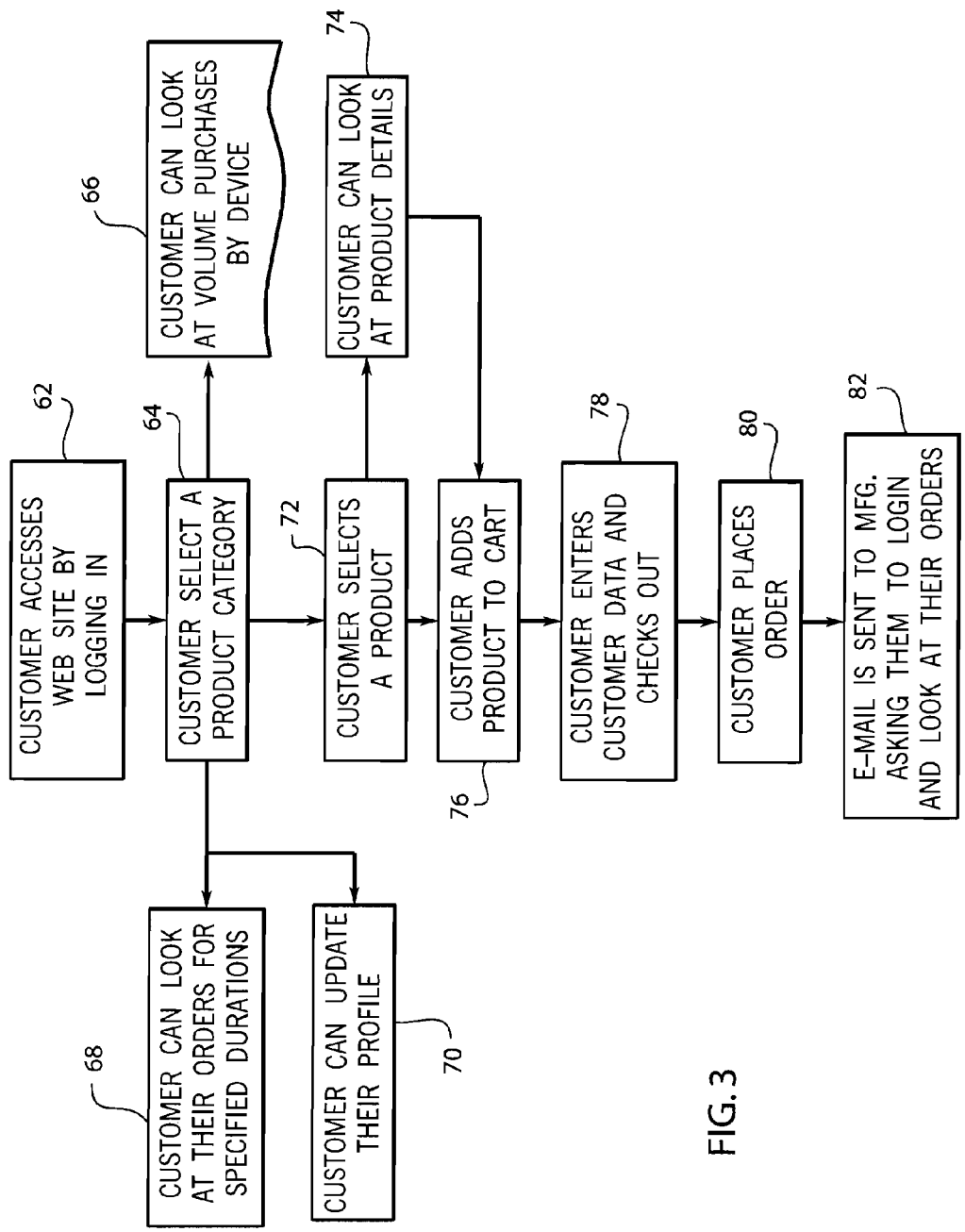
FIG. 3 is a process flowchart of the method of the present invention as it appears to the customer.

Referring now to FIG. 3, thereshown is a flowchart of the system of the present invention as it appears to a customer, such as the insurance company, when the customer is contacting the transaction facilitator. Initially, the insurance company accesses the transaction facilitator website through the internet, as illustrated in step 62. Once the insurance company has accessed the website, the insurance company selects a product category in step 64 based upon the patient need relayed by the physician's prescription. The product category includes the ability for the customer to look at the option of making a volume purchase, as illustrated in step 66, as well as the ability to look at past orders, as shown in step 68. Further, the customer can alter their user profile in step 70 while logged on to the transaction facilitator website.

After selecting a product category, the insurance company is presented with a series of specific medical devices that fall within the product category. From the list of devices, the insurance company is able to select a specific product, as indicated in step 72. The website includes specific product details that can be examined by the customer, as illustrated by step 74.

Once the customer has identified the preferred product, the customer adds the product to a shopping cart, as illustrated in step 76. From the shopping cart, the customer enters customer-specific data in step 78 and places the specific order in step 80. After the order has been placed, the website generates an e-mail to the selected manufacturer requesting the manufacturer to log in to the transaction facilitator website to access the order that has been placed. As can be understood in FIG. 3, at no time does information relating to the patient that has been input by the insurance company into the website transfer out of the website in an unsecured format to the manufacturer or any other third party. This prevents the breach of confidentiality of the patient by eliminating the flow of information. Instead, the transaction facilitator website contains the information which can be accessed by both the insurance company and the manufacturer without information ever being transferred therebetween.

Figure 4:
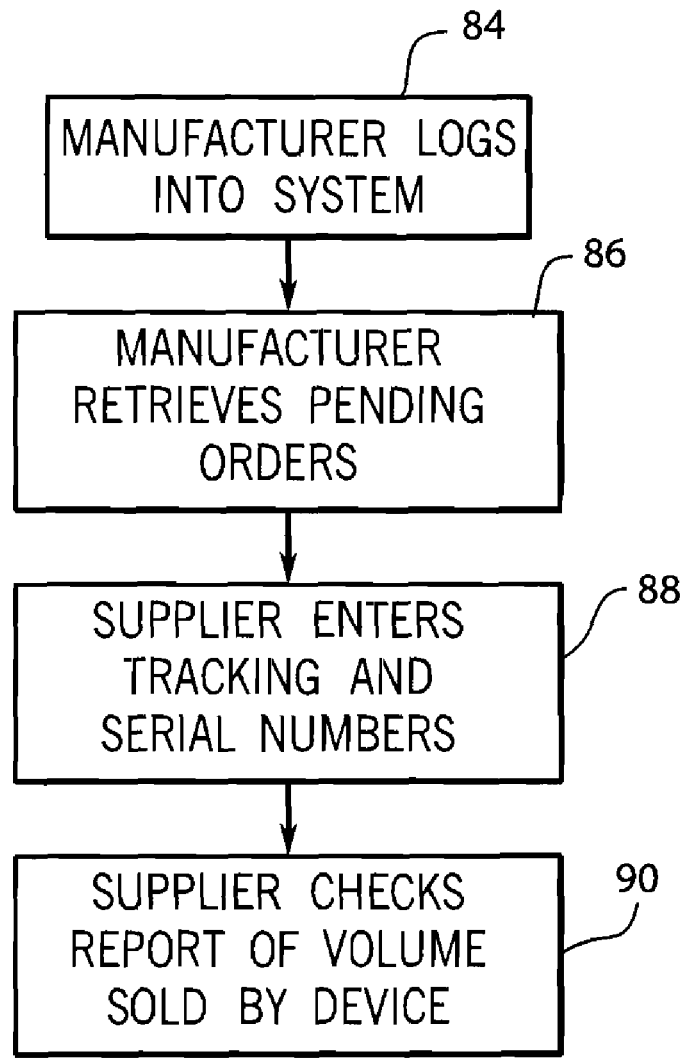
FIG. 4 is a process flowchart of the method of the present invention as seen by a device manufacturer.

Referring now to FIG. 4, thereshown is a flowchart of the system representing the steps taken by a manufacturer upon logging into the transaction facilitator's website to receive orders. Initially, the manufacturer logs in to the system, as illustrated in step 84. Upon logging in to the system using a specific user name and password, the manufacturer is able to retrieve pending orders, as illustrated in step 86. Once the pending order has been retrieved, the manufacturer ships the product and subsequently enters the tracking number and product serial number into the transaction facilitator database. The tracking number and serial number allow the transaction facilitator to monitor the current location of the device and whether or not the device has been delivered for implant.

In addition to retrieving and fulfilling orders, the manufacturer is able to determine the number of units that have been requested by the transaction facilitator and shipped by the manufacturer, as illustrated in step 90.

Figure 5:
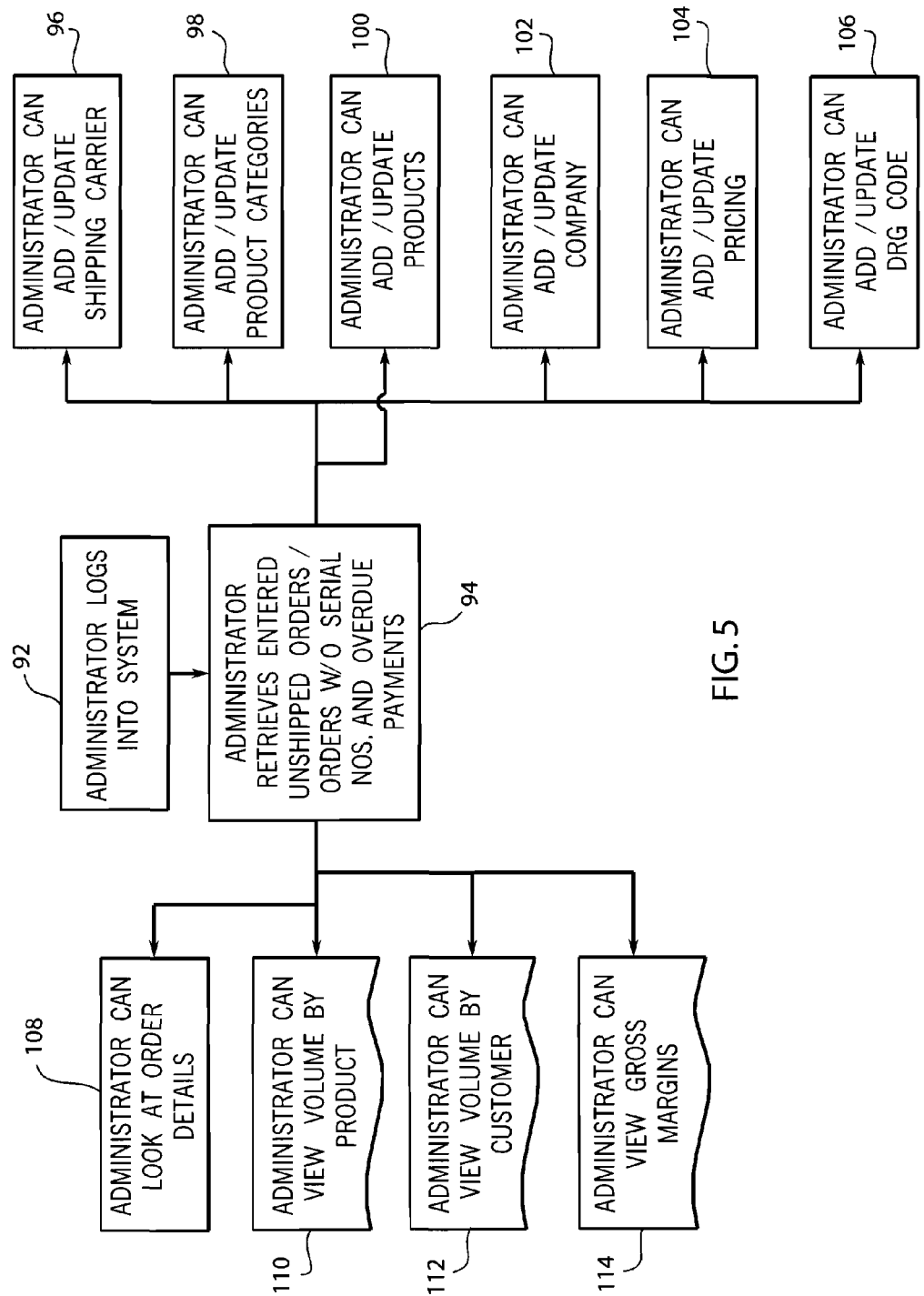
FIG. 5 is a process flowchart illustrating the method of the present invention as seen by an administrator of the transaction facilitator.

Referring now to FIG. 5, thereshown is the view of the transaction facilitator website as viewed from the administrator of the website itself. As illustrated in FIG. 5, the administrator initially logs into the system, as illustrated in step 92. Once in the system, the administrator is able to retrieve entered and unshipped orders, orders without serial numbers and overdue payments, as well as check the status of the number of devices shipped and sold, as illustrated in step 94. As illustrated in step 94, the administrator is able to perform various functions, such as updating the shipping carrier in step 96, updating product categories in step 98, updating products in step 100, updating company information in step 102, update pricing in step 104 and updating DRG codes in step 106. In this manner, the administrator is able to configure the website to correspond to industry standards and product mix and to specific requirements of the insurance company.

Further, the administrator can look at order details in step 108, view the volume of products being sold in step 110, view the volume purchased by various customers in step 112, such as different hospitals and healthcare facilities, and view the profit margins obtained by the transaction facilitator in step 114. Although representative functions capable of being performed by the administrator are shown in FIG. 5, it should be understood that the administrator can have access to almost any type of data entered and received by the transaction facilitator website. Thus, the transaction facilitator is able to generate various types of tracking reports as well as historical cost and volume reports.

Figure 6:
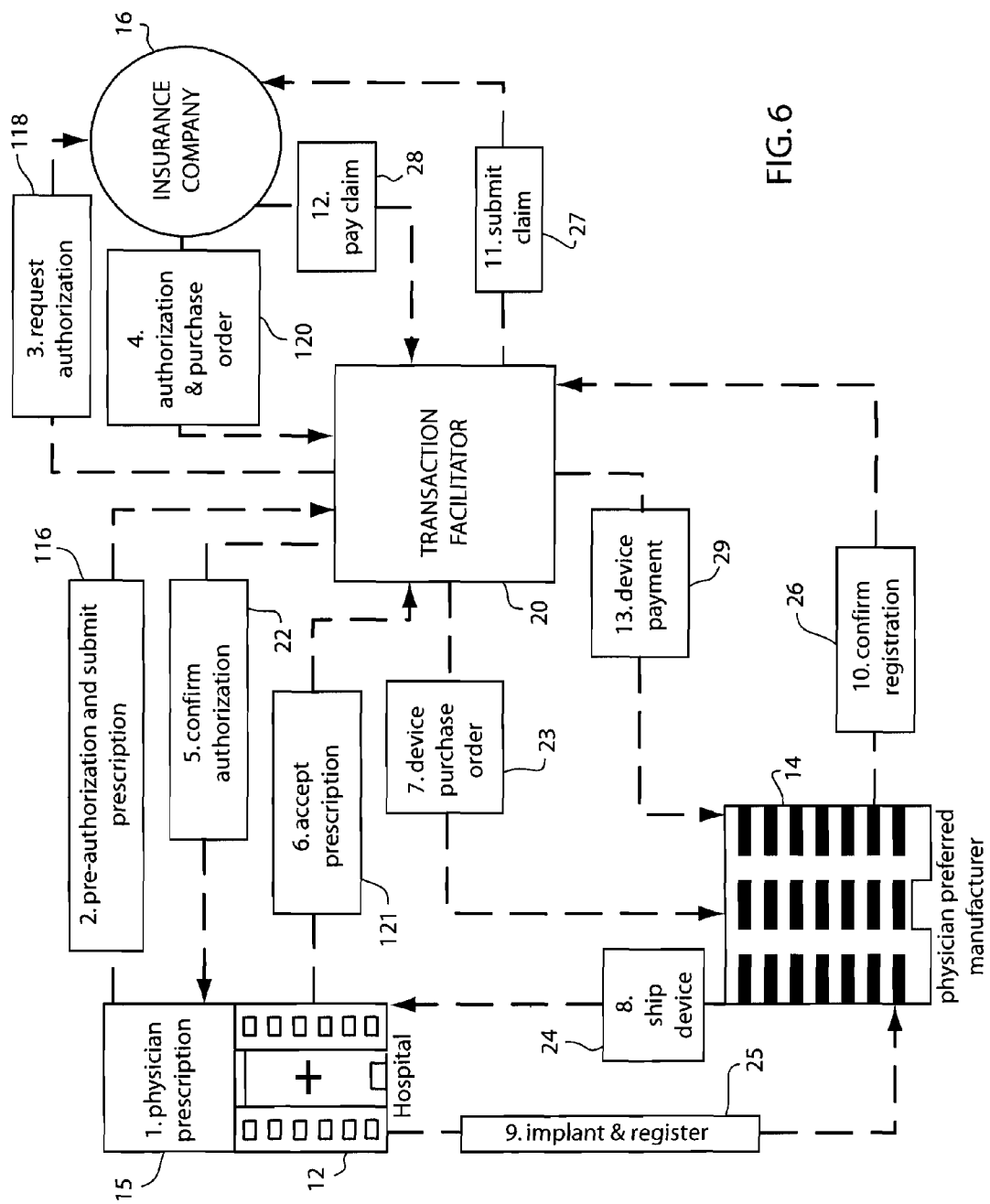
FIG. 6 is a schematic illustration of an alternate method of carrying out the ordering and delivery steps performed in accordance with the method of the present invention.

Referring now to FIG. 6, thereshown is an alternate embodiment of the invention illustrated in FIG. 1. As can be seen in FIG. 6, the agent for the hospital 12 or other healthcare facility interacts directly with the transaction facilitator 20 for pre-authorization and to submit the prescription from the physician, as illustrated by block 116. Preferably, this contact is through an internet connection to a website run by the transaction facilitator. Thus, the embodiment illustrated in FIG. 6 eliminates the need for the healthcare facility representative to telephone the insurance company with the patient information and the prescribed medical procedure from the physician. Upon logging on to the website, the agent or representative enters the patient information and the desired device for implantation. Upon receiving this information, the transaction facilitator contacts the insurance company 16 along the electronic connection illustrated by block 118. During this step, the transaction facilitator requests authorization and validates the insured for the procedure and device, as well as providing the required patient data to the insurance company. It is also contemplated by the inventors that the transaction facilitator could partner with the insurance company 16 such that the transaction facilitator itself could pre-authorize the prescribed treatment and medical device based upon data interfaced from the insurance company database. However, it is more likely that the insurance company will want to retain the authorization decision as is illustrated.

The insurance company 16 then authorizes the procedure and device, as illustrated in block 120. From this point, the transaction facilitator confirms the authorization to the physician or physician's agent. Upon receiving a confirmation of the authorization in step 5 of block 22, the physician is able to confirm the order and accept the prescription in step 121.

After the prescription has been accepted in block 121, the transaction facilitator 20 generates an order to an individual manufacturer, as was the case in the embodiment of FIG. 1. Thus, the embodiment of FIG. 6 includes the revised step of allowing the agent of the hospital or healthcare facility to contact the transaction facilitator 20 website directly without going through the insurance company 16. Thus, the agent of the hospital is able to more easily and quickly enter the information and request a specific device.

Various alternatives and embodiments are contemplated as being within the scope of the following claims particularly pointing out and distinctly claiming the subject matter regarded as the invention.

We claim:

1. A method of providing a device, the cost of which is covered by a third party payor, to a health care facility and obtaining payment for the device from the third party payor, the method comprising the steps of:

submitting a request for the device from the health care facility to the third party payor for authorization of payment;

relaying the request for the device from the third party payor to a transaction facilitator, the transaction facilitator being separate from the health care facility;

utilizing the transaction facilitator for contacting a manufacturer for the device to order the device requested by the health care facility without communication between the health care facility and the manufacturer, wherein the manufacturer delivers the device to the health care facility without billing the health care facility;

generating a cost claim for the device from the transaction facilitator to the third party payor;

receiving payment at the transaction facilitator for the claim from the third party payor; and transferring funds from the transaction facilitator to the manufacturer for payment for the device.

2. The method of claim 1 wherein the transaction facilitator includes an on-line website, wherein the step of relaying the request for the device from the third party payor to the transaction facilitator includes the third party payor electronically contacting the website.

3. The method of claim 2 wherein the step of submitting a request for the device to the third party payor includes the step of the health care facility electronically connecting to the website of the transaction facilitator to submit the request for the device.

4. The method of claim 2 wherein the step of ordering the device includes generating an electronic message from the website of the transaction facilitator to the manufacturer indicating that an order has been placed for the device.

5. The method of claim 4 further comprising the step of the device manufacturer accessing the website of the transaction facilitator to receive the order placed by the third party payor.

6. A method of providing a prescribed medical device covered by insurance to a healthcare facility and obtaining payment for the medical device from an insurance provider, the method comprising the steps of:

submitting a request for the medical device from the healthcare facility to the insurance provider for authorization;

relaying the request for the medical device from the insurance provider to a transaction facilitator, the transaction facilitator being separate from the health care facility;

utilizing the transaction facilitator to electronically contact a manufacturer for the medical device to order the medical device requested by the health care facility without communication between the health care facility and the manufacturer, wherein the manufacturer delivers the medical device to the healthcare facility without billing the health care facility;

generating a claim for the medical device from the transaction facilitator to the insurance provider;

receiving payment at the transaction facilitator for the claim from the insurance provider; and transferring funds from the transaction facilitator to the device manufacturer for payment for the medical device.

7. The method of claim 6 wherein the transaction facilitator includes an on-line website, wherein the step of relaying the request for the medical device from the insurance provider to the transaction facilitator includes the insurance provider electronically contacting the website.

8. The method of claim 7 wherein the step of submitting a request for the medical device to the insurance company includes the step of the healthcare facility electronically connecting to the website of the transaction facilitator to submit the request for the medical device.

9. The method of claim 7 wherein the step of ordering the medical device includes generating an electronic message from the website of the transaction facilitator to the device manufacturer indicating that an order has been placed for a medical device.

10. The method of claim 9 further comprising the step of the manufacturer accessing the website of the transaction facilitator to receive the order placed by the insurance provider.

11. A method of providing a device for use with a patient, the cost of which is covered by a third party payor, to a healthcare facility, the method comprising the steps of:

electronically submitting a request for a proposed treatment and a preferred device from the healthcare facility to the third party payor;

providing electronic authorization from the third party payor to the healthcare facility for the proposed treatment;

upon authorization, relaying the request for the preferred device from the third party payor to a transaction facilitator;

utilizing the transaction facilitator to contact a manufacturer for the device to order the device, wherein the manufacturer delivers the device to the health care facility without billing the health care facility;

generating a claim for the device from the transaction facilitator to the third party payor without billing the healthcare facility;

receiving payment at the transaction facilitator for the claim from the third party payor; and transferring funds from the transaction facilitator to the manufacturer for payment for the device.

12. The method of claim 11 wherein the step of authorizing the proposed treatment and the preferred device includes providing patient identification information and insurance coverage information to the third party payor prior to authorization.

13. The method of claim 11 wherein the request for the preferred device is made after the healthcare facility receives authorization for the proposed treatment.

14. The method of claim 11 wherein the step of authorizing the proposed treatment and the preferred device includes prompting the healthcare facility to respond to pre-determined treatment questions prior to receiving electronic authorization.

15. The method of claim 11 wherein the third party payor includes an on-line web site such that the requests for the proposed treatment and the preferred device are submitted to the third party payor web site.

16. The method of claim 15 wherein the transaction facilitator includes an on-line web site such that the third party payor electronically contacts the transaction facilitator web site.

17. The method of claim 11 wherein the step of requesting the preferred device includes selecting the preferred device from a list of devices.

18. The method of claim 11 wherein the request for the proposed treatment and the preferred device are both made prior to the electronic authorization from the third party payor.

19. The method of claim 1 wherein the transaction facilitator is separate from the third party payor and the healthcare facility.

20. The method of claim 6 wherein the transaction facilitator is separate from the insurance provider and the healthcare facility.

* * * * *